United States Patent Office 3,256,073
Patented June 14, 1966

3,256,073
LIQUID HYDROCARBON COMPOSITIONS HAVING ANTISTATIC PROPERTIES
Frederick G. Hess, Cranbury, N.J., assignor to Cities Service Oil Company, a corporation of Delaware
No Drawing. Filed Mar. 22, 1963, Ser. No. 267,358
1 Claim. (Cl. 44—66)

This invention relates to liquid hydrocarbon compositions to which antistatic properties have been imparted and more particularly it relates to liquid hydrocarbons which have had their electrical characteristics changed by the addition of both an organic acid salt of a metal and an organic orthophosphate salt of a basic aminoalkylacrylate polymer.

Fire and explosion hazards exist in the petroleum industry due to the movement of fuels in contact with another substance, such as a pipe, a filter, or droplets of water, which causes a separation of positive and negative charges of electricity. Since the fuels are normally poor conductors of electricity, the charge in the fuel is not dissipated rapidly and may build up to dangerous voltages. The high pumping rates during loading and storage operations and the number of filtrations required aggravate the situation, since both the flow rate and surface contacted increase the rate of charge generation.

A number of methods exist for preventing explosions due to static build-up in hydrocarbon fuels. One of these is the use of additives which increase the electrical conductivity of the fuel and thus prevent a charge build-up. However, the presently known additives suffer from various shortcomings, such as the need for relatively high concentrations of the additive or imparting undesirable properties to the fuel.

It has now been found that a liquid hydrocarbon containing both an organic metal salt and an organo-phosphate salt of a basic aminoalkylacrylate polymer has a greatly increased conductivity. The increased conductivity prevents or greatly diminishes static build-up in the liquid hydrocarbon. The combination of both an organic metal salt and the phosphate salt of the polymer are referred to herein as the antistatic composition or additive.

The organic acid metal salt of the antistatic composition is the salt of a metal having an atomic number of 20 to 56. The preferred metals are those having an atomic number of 22 to 28. Additionally, the alkaline earth metals having an atomic number of 20 to 56 have shown a high degree of activity in the antistatic compositions of this invention. Illustrative of the metals of the organic acid salt, there can be mentioned those of titanium, chromium, iron, nickel, calcium, strontium, barium, zirconium, and molybdenum. Those metals having more than one valence state can be used in their lower or higher valence states. The organic acid salt must be soluble in the hydrocarbon fuel at the concentrations employed. Hydrocarbon (hydrocarbyl) radicals of sufficient size such as those having 8 or more carbon atoms which are a part of the organic acid can impart the necessary oil solubility to the salts. Illustrative of the acids there can be mentioned the oil soluble carboxylic, phosphoric and sulfonic acids having an oil solubilizing hydrocarbon radical. The hydrocarbon radical of the acid can be either aliphatic, aromatic or combinations of these, e.g., alkyl, alkenyl, aryl, or alkaryl. When the hydrocarbyl radical is alkyl or alkenyl the chain can be straight, branched or cyclic, which preferably contains from about 8 to about 18 carbon atoms. Illustrative of the alkyls there can be mentioned: octyl; 2-ethylhexyl; nonyl; 2-ethylheptyl; decyl; undecyl; dodecyl; palmityl; octadecyl; eicosyl; 4-ethylcyclohexyl; 3-butylcyclohexyl; 2-isopropylcyclohexyl; cyclooctyl; cyclododecyl and the like. Illustrative of alkenyl radicals there can be mentioned oleyl and linoleyl. When the hydrocarbon radical is aryl, alkaryl or aralkyl the radical preferably has from about 8 to about 30 carbon atoms and particularly from about 8 to about 18 carbon atoms. The aryl radical can be mononuclear or polynuclear. Illustrative of the aryl containing radicals there can be mentioned: m-xylyl; 4-propylphenyl; 4-octylphenyl; dodecylphenyl; naphthyl; cedrenyl, 4-dodecylnaphthyl; 4,5-dinonylnaphthyl; 6-phenylhexyl; 4-nonylnaphthyl and the like. The aliphatic organic acid metal salts such as those of the fatty acids such as alkyls and mono-olefinic alkenyls are preferred.

Illustrative organic acid metal salts can be represented by the formulas:

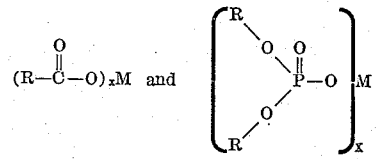

wherein each R is a hydrocarbon radical having from about 8 to about 18 carbon atoms, M is a metal having an atomic number of 20 to 56 and x is equal to the valence of the metal M. Illustrative of the organic acid metal salts there can be mentioned: the calcium, cobalt, nickel, strontium or barium salts formed with two mols of 2-ethylhexanoic acid; oleic acid; palmitic acid; coco acids; dinonyl naphthalene sulfonic acid; and bis(2-ethylhexyl) acid orthophosphate. Also, the use of three or four moles, as appropriate, of any of the above acids with nickel titanium, chromium and iron.

The second ingredient of the antistatic additive is the organic phosphate salt of certain polymers. The term polymer is used herein to embrace both homopolymers and copolymers. The phosphate salt is that of a dihydrocarbon substituted orthophosphate acid. The orthophosphate employed in neutralizing the polymer can be represented by the formula:

wherein each of R and R' is a hydrocarbon radical having at least about 6 carbon atoms. As in the case of the organic acid metal salt the hydrocarbon can be either aliphatic, aromatic or combinations of these. The various classes of hydrocarbon radicals as well as specific examples thereof given in the discussion of the organic acid also apply for the orthophosphate acid for neutralizing the polymer; preferably however each hydrocarbon radical of the orthophosphate will contain from about 6 to about 12 carbon atoms. Illustrative of the orthophosphates there can be mentioned: dihexyl acid orthophosphate, bis(2-ethylhexyl) acid orthophosphate; dinonyl acid orthophosphate; didecyl acid orthophosphate; octyl phenyl acid orthophosphate; isooctyl benzyl acid orthophosphate; nonyl naphthyl acid orthophosphate; diphenyl acid orthophosphate; bis(4-ethylcyclohexyl) acid orthophosphate; and the like. The polymer is preferably substantially neutralized with the phosphate. However, less than entire neutralization, i.e., of each basic amino group of the polymer, such as neutralization of major portion or at least about 80% of the basic amino groups in the polymer is satisfactory.

The polymers employed are those of a basic aminoalkylacrylate having from 2 to 3 carbons atoms in said alkyl radical and copolymers of said basic aminoalkylacrylate and an alkylacrylate having from 1 to about 10 carbon atoms. The polymer can be a homopolymer of the basic aminoalkylacrylate or it can contain up to about 80%, on a mole basis of the alkylacrylate. Preferably the copolymer will contain an equal molar ratio of the basic aminoalkylacrylate and alkylacrylate. The polymers employed in this invention can also contain minor amounts, i.e. less than about 50% by weight and preferably less than 20% of the unneutralized polymer, of other polymeric compounds. Typical examples of these filler components include well known ethylenically unsaturated addition polymerizable monomers, such as the vinyl and allyl formates, acetates, propionates, etc., ethylene, propylene, isobutylene, etc., styrene, vinyltoluene, etc., and short chain dienes, such as isoprene.

The polymers employed in this invention are prepared by methods well known in the art, such as heating the monomer or monomers in a solvent in the presence of a peroxide initiator such as benzoyl peroxide. The polymer can then be neutralized with the desired orthophosphate, alternatively the basic amino monomer can be neutralized prior to or concurrently with the polymerization. U.S. Patent 3,012,055 shows the preparation of copolymers of this invention. The disclosure of that patent is incorporated herein by reference for a more complete description of the copolymers and their preparation. The molecular weight of the unneutralized polymers can vary over a wide range. Illustratively, the molecular weight of the nuneutralized polymer can vary from about 5,000 to about 20,000.

Illustrative of the basic amino monomer there can be mentioned that of various acrylic and alkacrylic acids, e.g., 2-methylaminoethyl acrylate; 2-aminoethyl methacrylate; 2-ethylaminoethyl methacrylate; 3-octylaminopropyl methacrylate; 2-tertiarybutlaminoethyl acrylate; 2-piperidylethyl methacrylate, and the like. In this specification and claims the term "basic amino" is used in the generic sense to cover the primary, secondary and tertiary amines, including basic nitrogen-containing heterocyclics. Illustrative of the alkyl acrylate monomer there can be mentioned alkyl esters having from 1 to about 10 carbon atoms of various acrylic and alkacrylic acids, e.g., 2-ethylhexyl acrylate; decyl acrylate; methyl acrylate; methyl methacrylate; ethyl methacrylate; butyl methacrylate; octyl methacrylate; and the like.

A general chemical structure of the preferred neutralized basic aminoalkylacrylate can be represented by the following repeating unit:

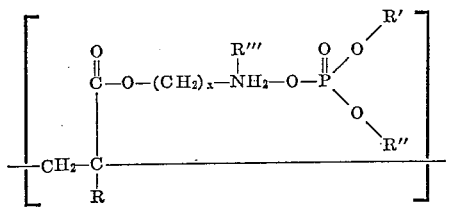

wherein R is methyl or hydrogen, R' and R'' are hydrocarbyl, e.g. alkyl, aryl, alkenyl, alkaryl, or aralkyl of from 6 to about 12 carbon atoms; R''' is hydrogen or alkyl of from 1 to about 8 carbon atoms and x is an integer having a value of 2 or 3.

A general chemical structure of the preferred neutralized copolymer of the basic aminoalkylacrylate and alkylacrylate can be represented by the following repeating unit:

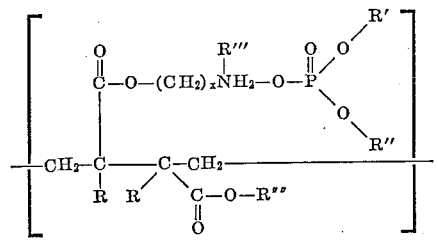

wherein each of R, R', R'', R''' and x have the same value or represent the same radical as in the above formula for the basic amino polymer and R'''' is an alkyl having from 1 to about 10 carbon atoms.

Neutralization of the basic amino group of the polymers improves the properties of the antistatic additive, e.g., it enhances its activity as an antistatic agent. The proportions of the orthophosphate neutralized polymer (also referred to simply as the polymeric salt) to the organic acid metal salt can vary over a wide range such as that of about 0.1 to 20 parts, by weight, of the polymeric salt per part of the organic acid metal salt and preferably from about 0.5 to about 10 parts, by weight, of the polymeric salt per part of the organic acid metal salt. The total quantity of the antistatic agent, i.e., organic acid metal salt and the orthophosphate neutralized polymer can vary over a wide range such as that from about less than 0.1 to about 10 or 15 pounds for 1,000 barrels of the liquid hydrocarbon. Preferably the liquid hydrocarbon contains from about 0.2 to about 5 pounds of the antistatic additive per 1,000 barrels of the liquid hydrocarbon. Of course larger quantities such as 30 pounds of the antistatic agent per 1,000 barrels of liquid hydrocarbon can be employed, but this is uneconomical and undesirable for fuels when used in internal combustion engines since it is desirable to keep the total quantity of additives and particularly metal salts to a minimum. Somewhat smaller quantities than the 0.1 pound concentration can also be employed although the conductivity of the hydrocarbon containing the antistatic agent should be at least about 200 picomho/m. in order to have the liquid hydrocarbon free from the static build-up. The liquid measure in barrels as used herein refers to 42 U.S. gallons.

For convenience in handling, the antistatic additives of this invention may be added to the hydrocarbon substrate as a concentrate in a suitable carrier, which is preferably a liquid hydrocarbon such as the substrate. For example 10% to 60%, usually about 50%, by weight of the antistatic additive in xylene or kerosene is preferred. However, it is understood that the antistatic additive can be incorporated in the liquid hydrocarbon substrate in any suitable manner and generally is effected with mixing in order to obtain intimate distribution of the additive in the substrate. When the antistatic additive is introduced into a flowing stream of hydrocarbon, mixing is accomplished by turbulence normally encountered therein.

The conductivity measurements herein are given in units of picomho/m. by the method described in Electrostatics in The Petroleum Industry (1958), Elsevier Publishing Co., New York, page 171. Briefly, this conductivity according to the above method is calculated from the time required to reduce a potential difference across a condenser to a certain fraction of its original value. The petroleum product under test is used as the dielectric in the condenser. The conductivity (K) is expressed as picomho/m.

Suitable hydrocarbon base liquids into which the conductivity or antistatic additives of this invention can be advantageously incorporated are those normally boiling within the range for from about minus 40° F. to about 700° F., i.e., those which are generally referred to as hydrocarbon distillates or liquid hydrocarbons boiling in the distillate fuel range. The invention is particularly applicable to petroleum distillates in the gasolene and kerosene boiling ranges such as gasolene, aviation turbine fuel, cleaner's naphtha, home heating oil, lighter fluid, rubber solvent, insecticide base, kerosene, and special boiling range solvents of all kinds such as direct cuts of xylenes and non-aromatics boiling in or near the xylene range or similar toluene or benzene cuts, and also extracts and raffinates obtained from such cuts. The invention is particularly advantageous in the case of aviation turbine fuels of a kerosene type, because of the extreme danger of static electrical charges in such fuels.

The antistatic additives of this invention are particularly beneficial since they can be employed in very small concentrations. Additionally it has been found that the antistatic additives of this invention are not extracted by water; they are not removed by filtration and hence are in true solution; and the addition of the antistatic agents of this invention at preferred concentrations to distillates does not appreciably increase the tendency of the fuel to carry water in suspension during transportation and storage operations.

It is understood that the antistatic additives of this invention may be used along with other additives used in liquid hydrocarbons such as metal deactivators, synergists, dye, fuel improvers, etc.

The following examples are illustrative of the invention and the preparation of the polymeric salts employed in the invention.

*Example 1.—Preparation of a copolymer of the bis (2-ethylhexyl) acid phosphate salt of tert-butylaminoethyl methacrylate and decyloctyl methacrylate*

Tert-butylaminoethyl methacrylate, 3.7 grams, bis (2-ethylhexyl) acid phosphate, 6.1 grams and decyloctyl methacrylate, 4.24 grams, were dissolved in 30 ml. of benzene and blown with nitrogen to remove air. Benzoyl peroxide, 0.05 gram, was added and the solution heated under reflux at 190° F. to 210° F. for five hours. The solution became viscous after only fifteen minutes of heating. The solvent was distilled off under vacuum.

*Example 2.—Preparation of a polymer of the bis (2-ethylhexyl) acid phosphate salt of tert-butylaminoethyl methacrylate*

Ten grams of bis (2-ethylhexyl) acid phosphate and six and a half grams of t-butylaminoethyl methacrylate were dissolved in 25 ml. of benzene and the solution blown with nitrogen to remove air. There was then added 0.05 gram of benzoyl peroxide and the solution was refluxed for two hours at 180° F. to 190° F. The reaction mixture was then diluted with ASTM naphtha and washed with dilute acetic acid to remove excess amine. It was then washed with water to remove the acetic acid. The reaction mixture of polymer and solvent was then dried by filtration to remove the solvent. Yield was 15.8 grams of a string viscous liquid.

*Example 3.—Preparation of a polymer of the bis (2-ethylhexyl) acid phosphate salt of tert-butylaminoethyl methacrylate*

Tert-butylaminoethyl methacrylate, 4.63 grams and 7.63 grams of bis (2-ethylhexyl) acid phosphate were dissolved in 25 ml. of benzene and the solution blown with $N_2$ to remove air. Benzoyl peroxide, 0.05 gram, was added and the solution was heated at 180° F. to 190° F. for 1.5 hours. The solvent was then evaporated leaving the polymer.

*Example 4*

Conductivity readings were made on the polymer of the bis (2-ethylhexyl) acid phosphate salt of tert-butylaminoethyl methacrylate in kerosene and the mixture of this polymer with the nickel soap of coco acid in kerosene. Five parts of the polymeric salt were employed for each part of the nickel soap, by weight. The results of these tests are shown in Table 1.

TABLE 1

| Polymer Alone | | Polymeric Salt and Metal Salt | |
|---|---|---|---|
| Concentration in in lbs./M bbls. | Conductivity in picomho/m. | Concentration in lbs./M bbls. | Conductivity in picomho/m. |
| 0 | 26.1 | 0 | 26.1 |
| 3.5 | 545 | 0.35 | 705 |
| 7.0 | 900 | 0.7 | 1,540 |
| 8.4 | 1,050 | 1.05 | 1,800 |

*Example 5*

Conductivity readings were made on the copolymer of the dioctyl acid phosphate salt of tert-butyl aminoethyl methacrylate and decylmethacrylate in kerosene and the mixture of the copolymer with chromic 2-ethylhexanoate wherein the chromium was trivalent. The copolymer contained equal molar quantities of each monomer and was substantially neutralized with dioctyl acid phosphate. The results of these tests are shown in Table 2. It can be seen from the results of that table that the two ingredients of the antistatic additive act synergistically.

TABLE 2

[Concentration, lbs./M bbls.]

| Polymeric Salt | 0 | 0 | 0 | 0 | 1.75 | 3.5 | 5.25 |
|---|---|---|---|---|---|---|---|
| Metal Salt | 0 | 1.75 | 3.5 | 5.25 | 5.25 | 5.25 | 5.25 |
| Conductivity in picomho/m | 26 | 52 | 100 | 144 | 3,470 | 5,100 | 6,170 |

[Concentration, lbs./M bbls.]

| Polymeric Salt Alone | 0 | 1.75 | 3.5 | 5.25 | 7.0 | 8.4 |
|---|---|---|---|---|---|---|
| Conductivity in picomho/m | 26.7 | 230 | 370 | 528 | 644 | 734 |

*Example 6*

Conductivity readings were made in kerosene on an antistatic additive consisting of the bis (2-ethylhexyl) acid phosphate salt of poly (tert-butylaminoethyl methacrylate) and the strontium salt of phenyl octyl acid phosphate. Five parts, by weight, of the polymeric salt were employed in the additive for every three parts of the strontium salt. The results of these tests are shown in Table 3.

TABLE 3

| Concentration of additive in lbs./M bbls.: | Conductivity in picomho/m. |
|---|---|
| 0 | 27.5 |
| 0.35 | 435 |
| 0.7 | 964 |
| 1.05 | 1385 |

*Example 7*

Conductivity readings were made in kerosene on an antistatic additive consisting of (1) the copolymer of decyloctyl methacrylate and the bis (isooctyl) acid phosphate salt of tert-butylaminoethyl methacrylate and (2) the titanium soap of a 2-ethylhexanoic acid in the proportions, by weight, of three parts of the titanium soap for each three parts of the polymeric salt. The results of these tests are shown in Table 4.

TABLE 4

| Concentration of additive in lbs./M bbls.: | Conductivity in picomho/m. |
|---|---|
| 0 | 25.6 |
| 1.75 | 665 |
| 3.5 | 3890 |

*Example 8*

Conductivity readings were made in kerosene on an antistatic additive consisting of (1) the copolymer of equal molar portions of decyloctyl methacrylate and the bis (2-ethylhexyl) acid phosphate salt of tert-butylaminoethyl methacrylate and (2) the calcium soap of coco acids wherein the proportion by weight of polymeric salt to metal salt was 6 to 4 respectively.

TABLE 5

| Concentration of additive in lbs./M bbls.: | Conductivity in picomho/m. |
|---|---|
| 0 | 25.6 |
| 2.1 | 700.0 |
| 3.5 | 1240 |

What I claim is:

A liquid hydrocarbon boiling in the distillate fuel range containing the chromium salt of 2-ethylhexanoate and the bis (ethylhexyl) acid phosphate salt of the copolymer of tert-butylaminoethyl methacrylate and decyl methacrylate, said liquid hydrocarbon containing from about 0.5 to about 10 parts of the salt of the copolymer per part of the metal salt and wherein the total quantity of the salt of the copolymer and metal salt is from about 0.1 to about 15 pounds per 1,000 barrels of the liquid hydrocarbon.

References Cited by the Examiner

UNITED STATES PATENTS

| | | | |
|---|---|---|---|
| 3,012,055 | 12/1961 | Pollitzer | 44—62 |
| 3,012,969 | 12/1961 | Minne et al. | 44—66 |
| 3,013,868 | 12/1961 | Skei et al. | 44—68 |
| 3,126,260 | 3/1964 | Minne et al. | 44—62 |

DANIEL E. WYMAN, *Primary Examiner.*

W. H. CANNON, *Assistant Examiner.*